(Model.)
A. A. SODERBERG.
CAKE CUTTER.
No. 490,993. Patented Jan. 31, 1893.
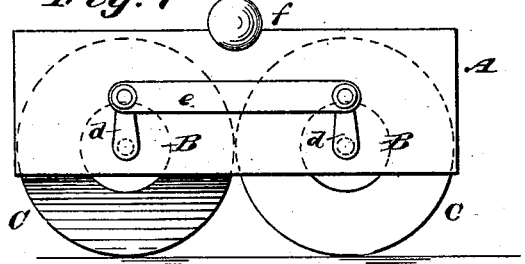
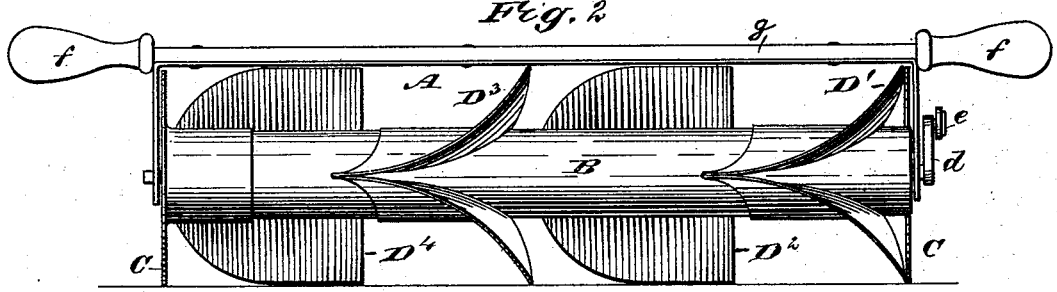
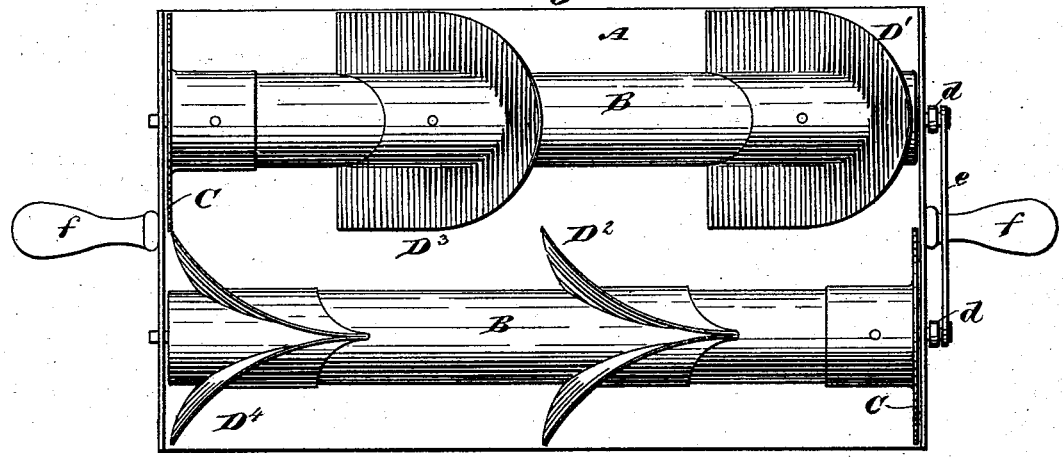
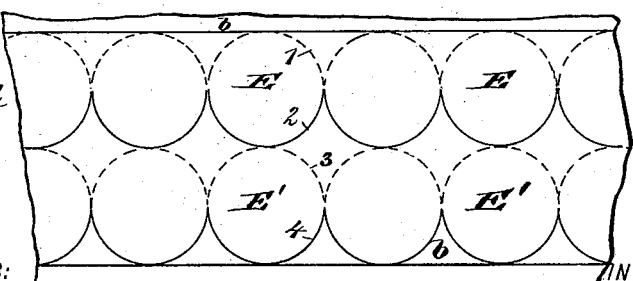
WITNESSES:
J. A. Bergstrom
C. Sedgwick
INVENTOR
A. A. Soderberg
BY Munn & Co.
ATTORNEYS

UNITED STATES PATENT OFFICE.

ANDERS ALFRED SODERBERG, OF BOSTON, MASSACHUSETTS.

CAKE-CUTTER.

SPECIFICATION forming part of Letters Patent No. 490,993, dated January 31, 1893.

Application filed May 16, 1892. Serial No. 433,126. (Model.)

*To all whom it may concern:*

Be it known that I, ANDERS ALFRED SODERBERG, of Boston, in the county of Suffolk and State of Massachusetts, have invented a new and useful Improvement in Cake-Cutters, of which the following is a full, clear, and exact description.

This invention consists in a frame carrying two rollers in parallel axial relation with each other, and designed to be run over the dough of which the cakes are to be made, said rollers being coupled to work in unison and proper relation with each other and being each armed with part cutters, whereby one part of each cake is cut by one roller and the other part thereof by the other roller, substantially as hereinafter described and more specifically pointed out in the claims.

Reference is to be had to the accompanying drawings forming a part of this specification, in which similar letters of reference indicate corresponding parts in all the figures.

Figure 1 represents an end elevation of a multiple dough cutting device for making cakes, embodying my invention; Fig. 2 a longitudinal elevation of the same; Fig. 3 an inverted plan thereof; and Fig. 4 a diagram in illustration of the action of the cake cutters.

The device, which is designed for both bakers and private or family use, may either be made single or multiple, that is, constructed for making either one row of cakes, or two or more parallel rows thereof, each time the device is run over the dough, according to the number of cutters with which the rollers are provided in direction of their length, and the cutters may be constructed and shaped to cut cakes out of the dough of various shapes, figures and sizes, but the device is shown in the drawings of multiple form for cutting two parallel rows of round cakes at a time, that is, each run made by it over the dough, and it will here be described accordingly.

A indicates a box like or rectangular frame, preferably made of sheet tin, and having its bottom and its two longitudinal or opposite sides left open. This frame carries two horizontal and parallel rollers or shafts B, B, arranged at a suitable distance apart and which are journaled in the opposite ends of the frame to freely rotate. One of these rollers is provided at one of its ends with a circular tin cutting wheel or disk C, and the other of said rollers with a like cutting disk C at its reverse end to that of the other disk. These cutting disks are of a diameter to project below their respective ends of the frame and serve, as the device is run over a layer of dough, of suitable thickness corresponding with the thickness of the cakes to be made, to direct the device in its course and to cut a path or strip, represented by the parallel lines $b\ b$ in Fig. 4, out of or through which the cakes, or pieces of dough forming the cakes, are cut, which disks being fast on the rollers or shafts B, B, serve to rotate the cake-cutting knives that are also fast to and carried by said rollers.

$D'$, $D^2$, $D^3$ and $D^4$, are the cake cutting or dough cutting knives of tin, on the rollers B, B. These knives or cutters are each of similar construction and project radially from the rollers B, B, to an extent corresponding or thereabout with the diameters of the cutting disks C, C. For cutting round cakes E, E' as shown in Fig. 4, said cutters are each formed of two curved or flaring blades on opposite sides of their respective rollers, the cutters on one roller flaring in a reverse direction to those on the other roller with which they work in connection, and being of such size in direction of the length of the rollers that the cutters on one roller slightly protrude beyond the length of their fellow cutters on the other roller to insure a full cut.

The rollers B, B, are coupled together to work in unison by cranks $d\ d$, on one end of their pivots, connected by a link or pitman $e$, which may be also made of tin, and the cutters on either one roller are arranged to radially project at right angles to the opposite or fellow cutters on the other roller with which they work in connection, so that when one set of cutters on one roller occupies a horizontal position the other set of cutters on the other roller occupies a vertical position. By this arrangement, each set of cutters on either one roller are virtually half or part cutters, that is to say, the cutters on the one roller register with the cutters on the other roller to respectively cut each only half or part of each alternate cake. Thus as the device is run over the dough, the cutters $D'$ and $D^2$ make the half or part cuts respectively of each cake E shown by dotted and full lines 1 and 2 shown in Fig. 4, and the cutters $D^3$ and $D^4$ make the half or part cuts respectively of each cake E' shown by dotted and full lines 3 and 4 in said Fig. 4.

Wooden or other handles $f$, may be secured to the ends of the frame A for pushing the device over and through the dough. These handles may be connected by a bar $g$, riveted to the frame A which will serve to stiffen or strengthen the latter.

By this dough cutting device for making cakes, many difficulties attendant upon previous modes or devices for cutting cakes will be overcome and a much larger amount of work can be done in a given time, by a mere child, than has been practicable heretofore by a skilled or journeyman baker. The dough too, will not stick to the cutters and the device can be worked with any speed required and very fast. It will never leave any scraps or remnants of dough after each cutting but what are unavoidable, dependent of course upon the shape of the cutters, and if the cutters are shaped to cut square or any kind of figures that will fit into each other, there will be no remnants whatever. The device then saves both time and labor both on account of the rapidity with which it may be worked and on account of the small amount of scrap it ordinarily will leave, after each cutting, to be worked over again. The device too can be constructed cheaply and be profitably sold at a comparatively low price, and its cutters are constructed of very few parts and can be readily stamped out by machine in various shapes and sizes.

Having thus described my invention, what I claim as new and desire to secure by Letters Patent, is—

1. A dough cutting device for making cakes, composed of a frame, a pair of horizontal parallel shafts or rollers carried by said frame, linked together to work in unison, cutting wheels on the ends of said rollers operating to rotate the latter and to guide the device as it is run over the dough, and radial cake forming cutters projecting from opposite sides of the rollers arranged, lengthwise of the two rollers, out of line but in overlapping relation with each other and at right angles in a radial direction or relation to one another, whereby each roller is made to cut one part of each cake and the other roller the other part of each cake, to give the cake its desired form or figure, substantially as specified.

2. In a dough cutting device of the character described, the combination with rollers and cake cutters on said rollers, of cutting and running wheels one on each roller at opposite ends thereof, substantially as described.

3. In a dough cutting device for making cakes, the combination of the frame A, the shafts or rollers B, B, the cutting wheels or disks C, C, on the ends of said rollers, the cranks $d\ d$ and connecting link $e$, and the cake-forming cutters D', $D^2$, $D^3$ and $D^4$, on said rollers arranged in relation with each other, substantially as described.

ANDERS ALFRED SODERBERG.

Witnesses:
JOHN G. SODERBERG,
JOHN CLASON.